United States Patent

[11] 3,615,357

| | | |
|---|---|---|
| [72] | Inventor | Eugene Wainer<br>Shaker Hts., Ohio |
| [21] | Appl. No. | 13,212 |
| [22] | Filed | Feb. 20, 1970 |
| [45] | Patented | Oct. 26, 1971 |
| [73] | Assignee | Horizons Research Incorporated |

[54] REMOVAL OF TIN FROM COPPER SCRAP
8 Claims, No Drawings

[52] U.S. Cl. .................................................. 75/64, 75/2, 75/98, 23/99
[51] Int. Cl. .................................................. C22b 25/06, C01g 19/06, C01g 19/08
[50] Field of Search .................................................. 23/99, 98; 75/72, 98, 117, 64

[56] References Cited
UNITED STATES PATENTS

| | | | |
|---|---|---|---|
| 851,946 | 4/1907 | Von Kugelen et al. ....... | 75/64 X |
| 3,490,898 | 1/1970 | Venkatakrishnan et al. . | 23/98 X |
| 344,575 | 6/1886 | Hasenbach ................... | 23/99 |
| 2,815,278 | 12/1957 | Wilkins ......................... | 75/72 |
| 3,161,465 | 12/1964 | Horn et al. .................... | 23/98 |
| 3,268,296 | 8/1966 | Hall et al. ..................... | 23/154 |

FOREIGN PATENTS

| | | | |
|---|---|---|---|
| 276,743 | 9/1927 | Great Britain ................ | 23/98 |

OTHER REFERENCES

" A Course in General Chemistry," Third Edition (1927), by W. McPherson and W. E. Henderson, page 272. Ginn & Co., New York.

*Primary Examiner* — Edward Stern
*Attorney* — Lawrence I. Field

ABSTRACT: Removal of metallic tin from copper scrap on which the tin is present as a coating by heating in a controlled atmosphere whereby the tin is removed as a volatile chloride.

REMOVAL OF TIN FROM COPPER SCRAP

This invention relates to the quantitative removal of metallic tin from copper scrap on which the tin is present as a coating.

One of the most troublesome impurities in copper scrap is metallic tin. For many intended uses, tin must be removed below detectable limits in order for the full utility of the copper recovered from the scrap to be realized.

The present invention is directed to the quantitative removal of tin from copper scrap, on which the tin is present as a coating on the surface of the copper scrap, usually either in the form of metallic tin or in the form of tin-lead solder.

Briefly, it has been found that if copper wire containing a coating of tin or tin-lead solder, the amount of tin being usually not more than a few tenths of a percent by weight of copper, is heated in a controlled atmosphere furnace to a temperature of at least 900° F., and preferably to at least 1100° F., that the tin is removed quantitatively as gaseous tin tetrachloride or possibly a mixture of a major portion of tin tetrachloride and a minor portion of tin dichloride, such removal being contingent on the presence of a significant proportion of gaseous HCl in the furnace atmosphere. The required HCl may be produced adventitiously in the furnace from chlorine-containing plastic coatings on the copper scrap, such as polyvinylchloride, chlorinated rubber and similar coatings, or it may be produced by the addition of suitable chlorine-containing compounds to the furnace.

The controlled atmosphere referred to is produced most advantageously as the result of destructive distillation of organic insulation normally used for coating copper wire. When produced in accordance with U.S. Pat. application Ser. No. 874,891 filed Nov. 7, 1969, the destructive distillation of nonoxygen containing plastics, such as polyethylene and/or rubber, will yield a mixture of low molecular weight gaseous hydrocarbons and hydrogen. When plastics, such as epoxy, glyptal, polyesters and the like, represent the coatings, the gases produced comprise a mixture of gaseous hydrocarbons, hydrogen, carbon monoxide and not more than 5 percent by volume of $CO_2$ and usually less than 1 percent by volume of carbon dioxide.

Active removal of tin starts at about 900° F. and becomes exceptionally rapid as the temperature rises so that the evolution of the tin as a gaseous compound takes place in less than a minute at 1100° F. and higher. If the temperature is raised into the range of 1300° F. to 1500° F., lead is also removed as a gaseous chloride at the same time.

With a charge of insulated wire averaging about 50 percent copper and 50 percent insulation, heated in a furnace capable of processing 100 pounds per hour of the combination of insulation and copper, it has been found that adequate amounts of the detinning atmosphere is produced from the heating of the insulation, provided that at least 5 percent of the insulation fed to the furnace is comprised of polyvinylchloride, or at least 10 percent of the insulation is chlorinated rubber. Similar amounts of other chlorine containing insulation may be used to provide the desired atmosphere. Such insulation will usually produce in addition to gaseous HCl, gaseous hydrocarbons and hydrogen on destructive distillation, in the absence of air or oxygen. In the absence of the availability of such materials in the scrap charge, an addition of a minimum of 7 parts of ammonium chloride per 100 parts of feed suffices to provide the desired HCl in the furnace atmosphere. U.S. Pat. No. 491,034 describes the utility of $NH_4Cl$ for removal of tin, but requires that such tin be in oxide form prior to treatment with $NH_4Cl$, contrary to the teachings of this invention which requires the presence of a neutral or reducing atmosphere and much higher temperatures than the above patent. It is also possible to feed anhydrous HCl in gaseous form into the furnace at the rate of approximately 500 cc. of such HCl per minute. As a result of the presence of the HCl, from whatever source, the tin on the scrap is quantitatively removed from the surface under the temperature conditions described above.

In summary then, tin and/or lead present as surface coatings on copper wire are removed quantitatively in a controlled atmosphere furnace at temperatures in the range of 900° to 1500° F., provided a small amount of anhydrous HCl is available in the atmosphere of the furnace. While this atmosphere may be maintained by bleeding in gaseous anhydrous HCl into the furnace or through the use of ammonium chloride, the preferred technique is to provide a furnace charge in which at least 10 percent of the feed material is comprised of a chlorinated plastic material, such as polyvinylchloride or chlorinated rubber which on decomposition under the conditions prevailing in the furnace forms anhydrous HCl in situ in amounts sufficient to yield the desired quantitative removal of tin and/or lead. Since such a large proportion of commercial insulated copper wire is coated with chlorine-containing plastics, it is a simple matter, from a practical standpoint, to have available this in situ source of HCl at all times by suitable mixture of starting raw materials.

A preferred furnace in which this invention may be practiced is described in U.S. Pat. application Ser. No. 874,891 filed Nov. 7, 1969. Other commercially available furnaces in which a charge is passed through a heated zone in which both the atmosphere and temperature may be controlled have also been found suitable. The furnace would be provided with means to recover the tin chloride and any lead chloride from the gases discharged so as to avoid polluting the atmosphere.

I claim:

1. A process for the selective and quantitative removal of tin from copper scrap on which the tin is present as a coating, which comprises the steps of:
   a. feeding the tin-contaminated scrap into a furnace;
   b. heating the tin-contaminated scrap to a temperature within the range of 900°–1500° F.;
   c. maintaining said heated scrap at said temperature while providing therein an amount of anhydrous hydrogen chloride gas, and in a controlled nonoxidizing furnace atmosphere, sufficient to essentially combine with all of said tin to form a gaseous tin chloride;
   d. separately recovering said copper scrap after it has been detinned and recovering said tin as a tin chloride.

2. The process of claim 1 wherein the gaseous HCl is produced from chlorine-containing nonmetallic material constituting a portion of the furnace charge.

3. The process of claim 2 wherein the chlorine-containing material comprises insulation on the tin-contaminated scrap.

4. The process of claim 3 wherein at least 5 percent of the insulation is polyvinylchloride.

5. The process of claim 3 wherein at least 10 percent of the insulation is chlorinated rubber.

6. The process of claim 1 wherein the nonoxidizing atmosphere is produced in the furnace by heating the organic insulation on the tin-contaminated scrap in the absence of air or oxygen.

7. The process of claim 1 wherein the furnace atmosphere is maintained nonoxidizing by providing a flame curtain at the furnace inlet.

8. The process of claim 1 wherein the furnace atmosphere consists principally of the products resulting from destructive distillation in the absence of air or oxygen of the organic material present in the tin-contaminated scrap.